US010984971B2

(12) United States Patent
Ueno

(10) Patent No.: US 10,984,971 B2
(45) Date of Patent: Apr. 20, 2021

(54) SWITCH OPERATION MECHANISM

(71) Applicant: KABUSHIKI KAISHA TOKAI RIKA DENKI SEISAKUSHO, Aichi (JP)

(72) Inventor: Hiroshi Ueno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/179,276

(22) Filed: Nov. 2, 2018

(65) Prior Publication Data

US 2019/0139723 A1  May 9, 2019

(30) Foreign Application Priority Data

Nov. 8, 2017  (JP) .............................. JP2017-215545

(51) Int. Cl.
*H01H 25/00* (2006.01)
*H01H 19/14* (2006.01)
*F16D 3/16* (2006.01)
*G05G 9/047* (2006.01)
*H01H 19/56* (2006.01)
*G05G 1/08* (2006.01)

(52) U.S. Cl.
CPC .............. *H01H 19/14* (2013.01); *F16D 3/16* (2013.01); *G05G 9/047* (2013.01); *H01H 19/56* (2013.01); *H01H 25/008* (2013.01); *G05G 1/08* (2013.01); *G05G 2009/04751* (2013.01); *G05G 2009/04781* (2013.01); *H01H 2221/014* (2013.01)

(58) Field of Classification Search
CPC ..................... H01H 19/14; G05G 2009/04781
See application file for complete search history.

(56) References Cited

U.S. PATENT DOCUMENTS

| 5,711,415 | A | 1/1998 | Fukuda et al. |
| 6,100,480 | A | 8/2000 | Takahashi |
| 7,728,237 | B2 * | 6/2010 | Pedersen ............. H01H 25/008 200/11 R |
| 2007/0256919 | A1 | 11/2007 | Pedersen et al. |

(Continued)

FOREIGN PATENT DOCUMENTS

| DE | 102010023171 | 1/2011 |
| EP | 2045826 | 4/2009 |

(Continued)

OTHER PUBLICATIONS

Official Communication issued in EPO Patent Application No. 18204803.3, dated Apr. 3, 2019.

*Primary Examiner* — Felix O Figueroa
(74) *Attorney, Agent, or Firm* — Greenblum & Bernstein, P.L.C.

(57) ABSTRACT

A switch operation mechanism includes: a knob configured to be rotatable about a first rotation axis; a rotor configured to be rotatable about a second rotation axis; a first transmission mechanism configured to transmit rotation of the knob to the rotor and including a slide mechanism configured to allow displacement of the knob in a first direction intersecting with the second rotation axis; and a second transmission mechanism configured to convert the displacement of the knob in the first direction into an operation of a switch.

11 Claims, 13 Drawing Sheets

(56) References Cited

U.S. PATENT DOCUMENTS

| | | | |
|---|---|---|---|
| 2010/0321215 A1 | 12/2010 | Kato et al. | |
| 2014/0043303 A1 | 2/2014 | Baker et al. | |
| 2015/0185757 A1* | 7/2015 | Jantke | G05G 9/04792 74/471 XY |

FOREIGN PATENT DOCUMENTS

| | | |
|---|---|---|
| FR | 2059342 | 5/1971 |
| JP | 10-269902 | 10/1998 |
| JP | 10-340653 | 12/1998 |
| JP | 2007-250261 | 9/2007 |
| JP | 2011-003505 | 1/2011 |
| JP | 2015-526853 | 9/2015 |

* cited by examiner

SWITCH OPERATION MECHANISM

CROSS-REFERENCE TO RELATED APPLICATION(S)

This application is based upon and claims the benefit of priority from prior Japanese patent application No. 2017-215545, filed on Nov. 8, 2017, the entire contents of which are incorporated herein by reference.

TECHNICAL FIELD

The present invention relates to a switch operation mechanism. More specifically, the present invention relates to a switch operation mechanism including a knob configured to be rotatable about a rotation axis.

BACKGROUND ART

JP-A-2015-526853 discloses the above type of the switch operation mechanism. A rotation amount of the knob is detected by a sensor, and a signal for executing an operation corresponding to the rotation amount is generated.

SUMMARY OF INVENTION

An object of the present invention is to improve a degree of operation freedom of the knob configured to be rotatable about the rotation axis.

According to an aspect of the invention, there is provided a switch operation mechanism comprising: a knob configured to be rotatable about a first rotation axis; a rotor configured to be rotatable about a second rotation axis; a first transmission mechanism configured to transmit rotation of the knob to the rotor and including a slide mechanism configured to allow displacement of the knob in a first direction intersecting with the second rotation axis; and a second transmission mechanism configured to convert the displacement of the knob in the first direction into an operation of a switch.

DESCRIPTION OF EMBODIMENTS

Hereinafter, illustrative embodiments of the present invention will be described in detail with reference to the accompanying drawings. In the accompanying drawings, an arrow F indicates a forward direction of the shown structure. An arrow B indicates a backward direction of the shown structure. An arrow U indicates an upward direction of the shown structure. An arrow D indicates a downward direction of the shown structure. An arrow R indicates a rightward direction of the shown structure. An arrow L indicates a leftward direction of the shown structure. The directions are defined for convenience of descriptions, and are not intended to limit a posture when using the shown structure.

Figure 1:
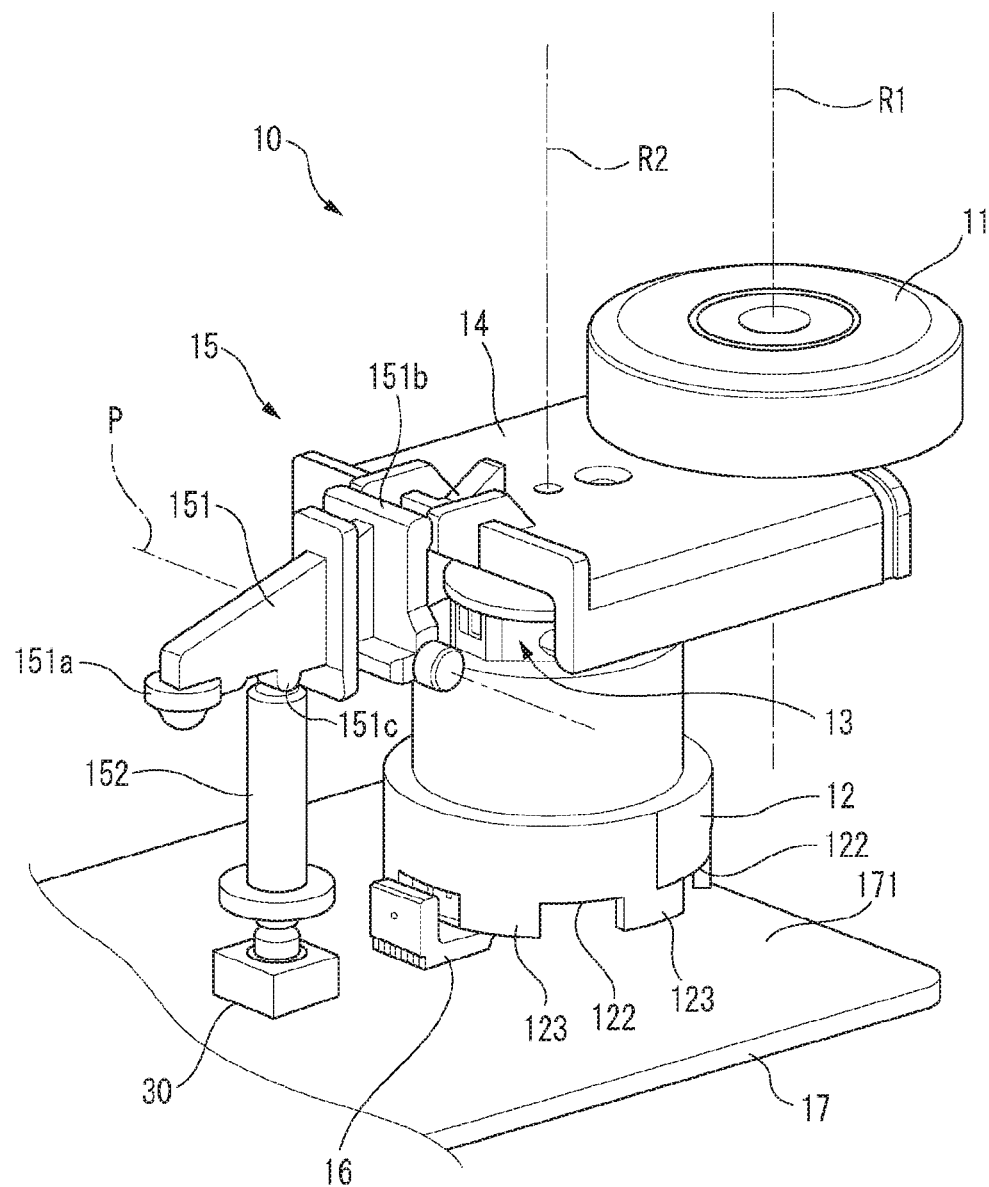
FIG. 1 depicts an outer shape of a switch operation mechanism in accordance with a first illustrative embodiment.
Figure 1:
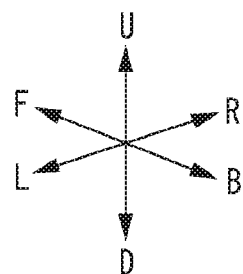

FIG. 1 depicts an outer shape of a switch operation mechanism 10 in accordance with a first illustrative embodiment. The switch operation mechanism 10 is a mechanism for operating a switch 30.

The switch operation mechanism 10 includes a knob 11. The knob 11 is configured to be rotatable about a first rotation axis R1.

The switch operation mechanism 10 includes a rotor 12. The rotor 12 is configured to be rotatable about a second rotation axis R2.

Figure 2:
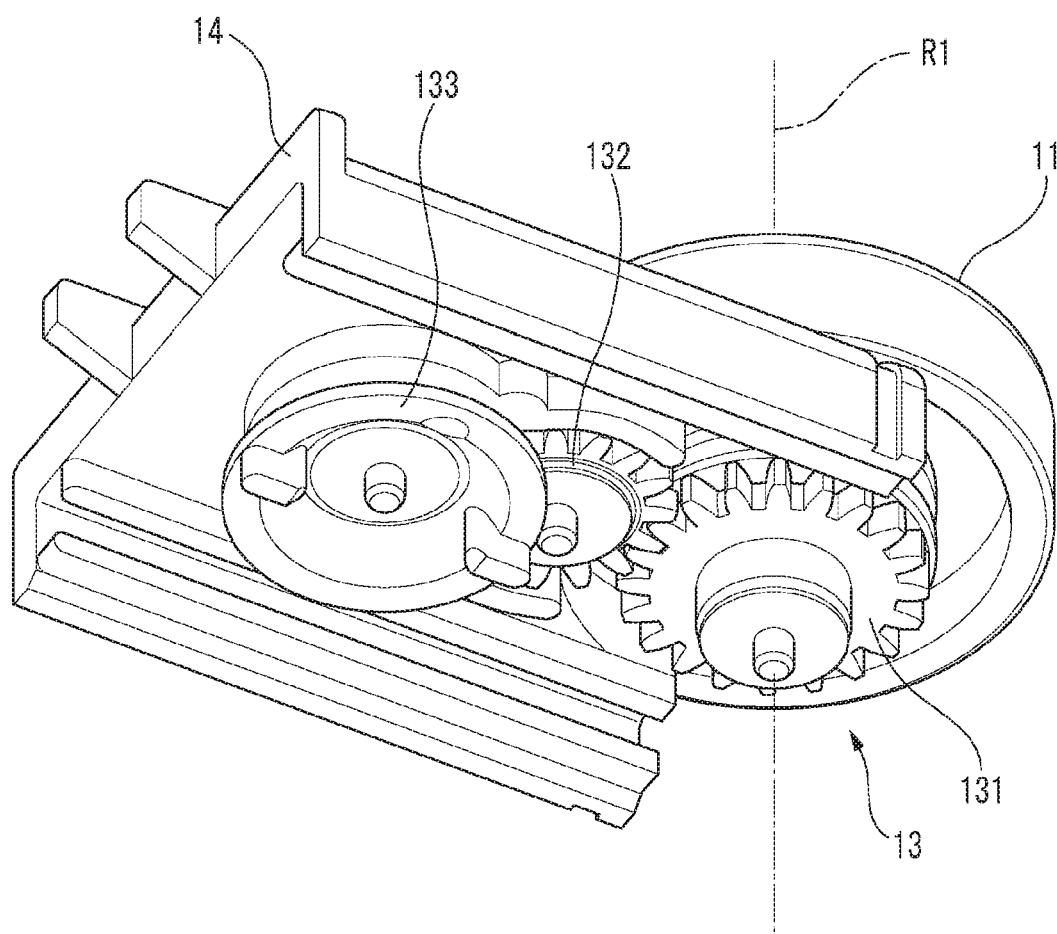
FIG. 2 depicts a part of the switch operation mechanism of FIG. 1.
Figure 2:
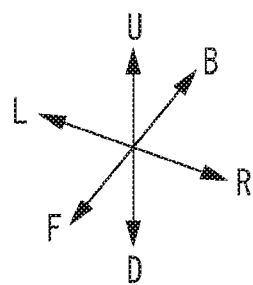

As shown in FIG. 2, the switch operation mechanism 10 includes a first transmission mechanism 13. The first transmission mechanism 13 is a mechanism configured to transmit rotation of the knob 11 to the rotor 12. Specifically, the first transmission mechanism 13 includes a first gear 131, a second gear 132, and a third gear 133. The first gear 131 is mounted to the knob 11. The second gear 132 is meshed with the first gear 131. The third gear 133 is meshed with the second gear 132.

The switch operation mechanism 10 includes a holder 14. The holder 14 is configured to hold the knob 11, the second gear 132 and the third gear 133.

Figure 3:
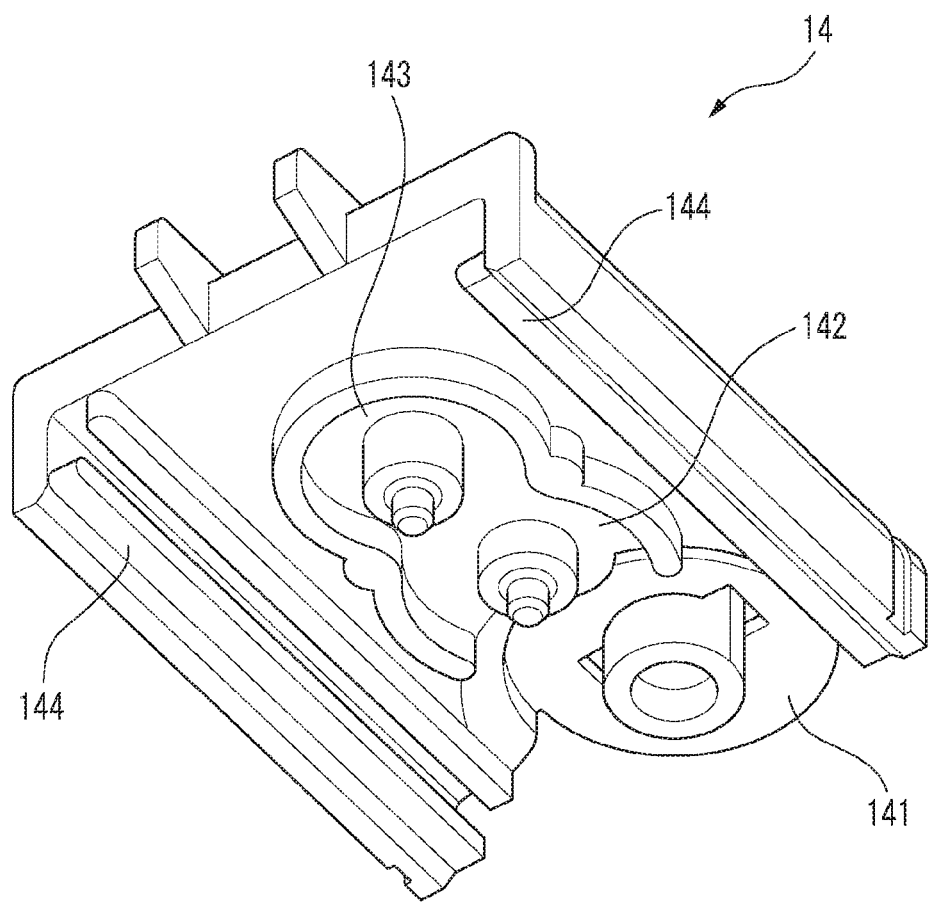
FIG. 3 depicts a part of the switch operation mechanism of FIG. 1.
Figure 3:
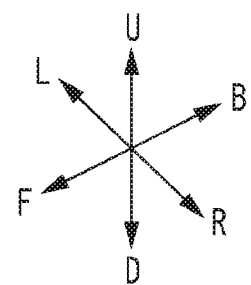

As shown in FIG. 3, the holder 14 includes a first holding part 141, a second holding part 142, a third holding part 143, and a slide rail 144. The first holding part 141 is configured to rotatably hold the knob 11. The second holding part 142 is configured to rotatably hold the second gear 132. The third holding part 143 is configured to rotatably hold the third gear 133. The slide rail 144 extends in the right and left direction. The holder 14 is supported to be slidable in the right and left direction via the slide rail 144 by a support member (not shown).

Figure 4:
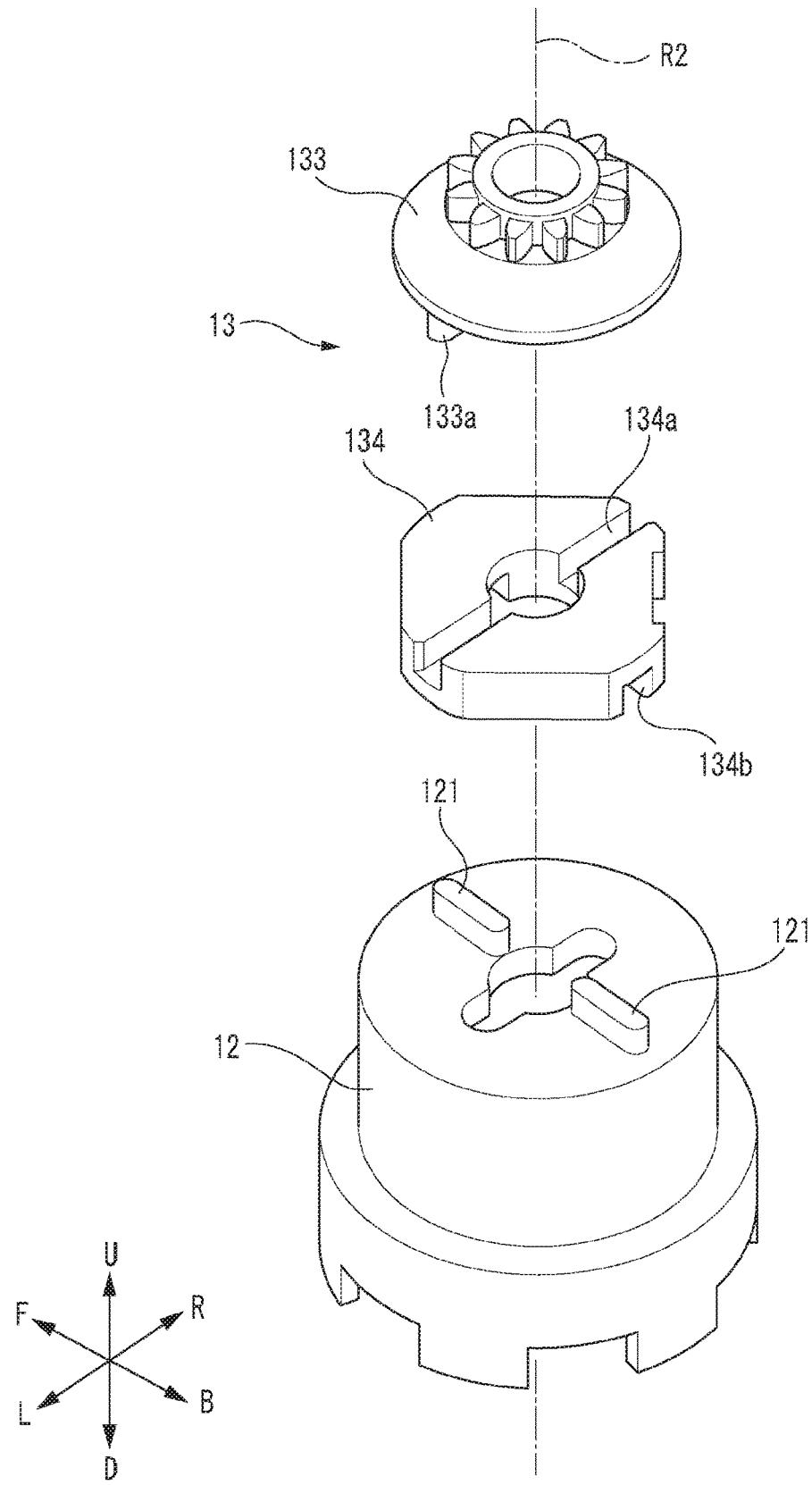
FIG. 4 depicts a part of the switch operation mechanism of FIG. 1.
Figure 5:
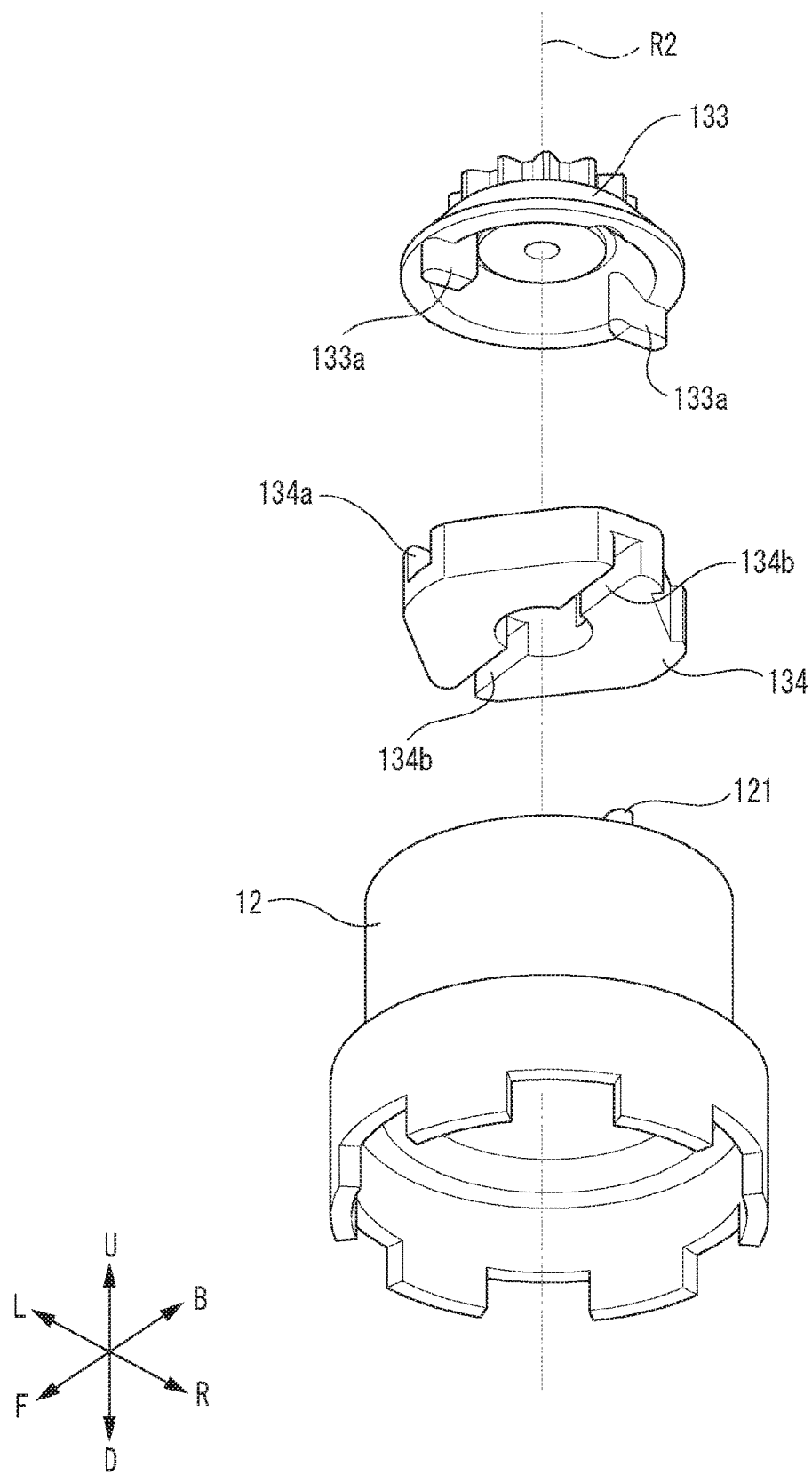
FIG. 5 depicts a part of the switch operation mechanism of FIG. 1.

As shown in FIGS. 4 and 5, the first transmission mechanism 13 includes a joining member 134. The joining member 134 has an upper groove 134a and a lower groove 134b. The upper groove 134a is formed on an upper surface of the joining member 134. The lower groove 134b is formed on a lower surface of the joining member 134. The upper groove 134a and the lower groove 134b extend in directions intersecting with each other.

In the meantime, the third gear 133 has a protrusion 133a. The protrusion 133a is formed at a lower part of the third gear 133. The rotor 12 has a protrusion 121. The protrusion 121 is formed at an upper part of the rotor 12.

Figure 6:
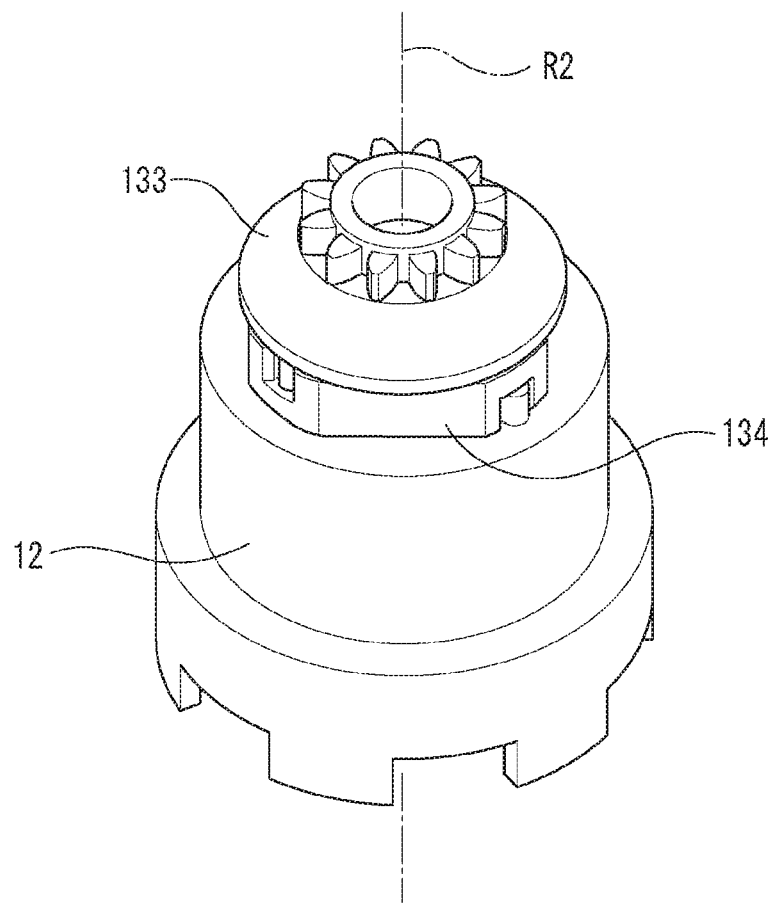
FIG. 6 depicts a part of the switch operation mechanism of FIG. 1.
Figure 6:
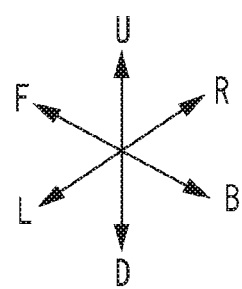

FIG. 6 depicts a joined state of the third gear 133, the joining member 134 and the rotor 12. In this state, the protrusion 133a of the third gear 133 is engaged with the upper groove 134a of the joining member 134. The protrusion 121 of the rotor 12 is engaged with the lower groove 134b of the joining member 134.

The rotation of the knob 11 is transmitted to the third gear 133 via the first gear 131 and the second gear 132. The rotation of the third gear 133 is transmitted to the rotor 12 via the joining member 134. Therefore, the rotor 12 is configured to rotate about the second rotation axis R2, in correspondence to the rotation of the knob 11 about the first rotation axis R1.

As shown in FIG. 1, the switch operation mechanism 10 includes a second transmission mechanism 15. The second transmission mechanism 15 includes a rotary member 151 and a pressing member 152. The rotary member 151 is supported to a support member (not shown) to be rotatable about a rotation axis P. A first part 151a of the rotary member 151 is urged upward by a spring (not shown). Thereby, the rotary member 151 is urged in a clockwise direction about the rotation axis P, in FIG. 1. A second part 151b of the rotary member 151 is in contact with one end portion 145 of the holder 14. A third part 151c of the rotary member 151 is in contact with an upper end of the pressing member 152. A lower end of the pressing member 152 is in contact with the switch 30.

Figure 7A:
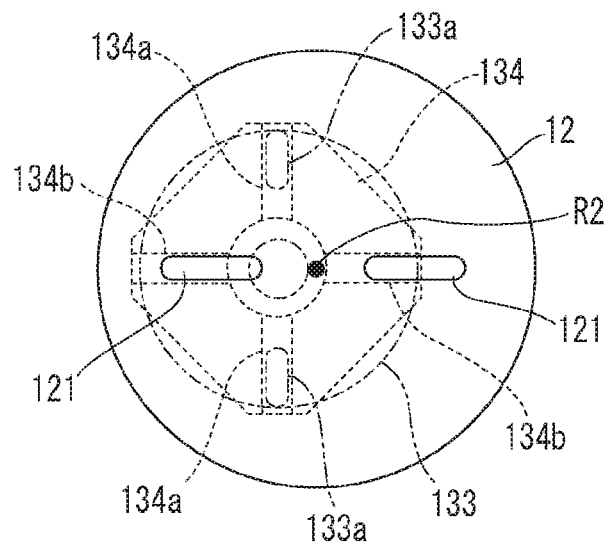
FIGS. 7A to 7C are views for illustrating operations of the switch operation mechanism of FIG. 1.
Figure 7A:
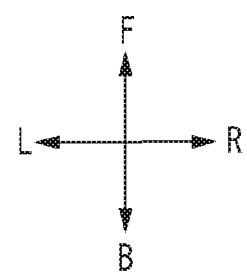

When the joining member 134 takes a posture shown in FIG. 7A, the upper groove 134a extends in the front and back direction, and the lower groove 134b extends in the right and left direction. In this state, when the knob 11 is pushed leftward, the holder 14 holding the knob 11 is slid leftward. The third gear 133 held by the holder 14 is also slid leftward. Thereby, the joining member 134 engaged with the protrusion 133a of the third gear 133 via the upper groove 134a is also slid leftward. On the other hand, the protrusion 121 of the rotor 12 engaged with the lower groove 134b in which it is slid keeps an initial position. As a result, the knob 11 is slid leftward, independently of the rotor 12.

By the above operations, one end portion 145 of the holder 14 pushes leftward the second part 151b of the rotary member 151. The rotary member 151 is rotated against the urging force of the spring about the rotation axis P in the counterclockwise direction in FIG. 1. Thereby, the third part 151c of the rotary member 151 presses downward the pressing member 152, so that the switch 30 is operated. That is, the holder 14 also configures a part of the second transmission mechanism 15.

When the leftward pressing operation to the knob 11 is released, the rotary member 151 is rotated about the rotation axis P in the clockwise direction in FIG. 1 by the urging force of the spring. Thereby, the second part 152b of the rotary member 151 pushes rightward one end portion 145 of the holder 14, so that the third gear 133 held by the holder 14 is slid rightward. The joining member 134 engaged with the protrusion 133a of the third gear 133 via the upper groove 134a is also slid rightward. As a result, the knob 11 returns to the initial position.

That is, the joining member 134 functions as a slide mechanism configured to allow the displacement of the knob 11 in the right and left direction intersecting with the second rotation axis R2 extending in the upper and lower direction.

According to the above configuration, it is possible to perform the slide operation of the knob 11 in the direction intersecting with the second rotation axis R2 of the rotor 12, in addition to the operation of transmitting the rotation of the knob 11 to the rotor 12. Accordingly, it is possible to improve a degree of operation freedom of the knob 11 configured to be rotatable about the first rotation axis R1. Also, since a position of the second rotation axis R2 does not change during the displacement of the knob 11, it is not necessary to prepare a configuration premised on the displacement of the rotor 12. Thereby, it is possible to simplify a structure of the switch operation mechanism 10.

In the example of FIG. 7A, as the knob 11 is displaced, both the third gear 133 and the joining member 134 are displaced in the same direction. In the first illustrative embodiment, the third gear 133 is configured to be displaceable relative to the joining member 134. That is, the third gear 133 and the joining member 134 function as two sliders capable of being displaced in the directions intersecting with each other.

Figure 7B:
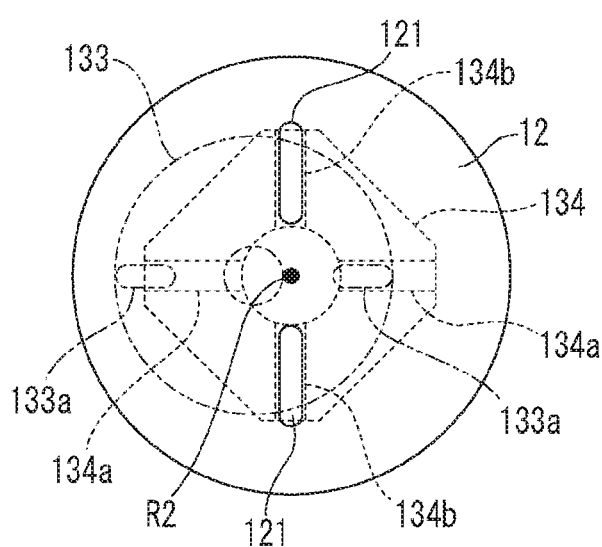
Figure 7B:
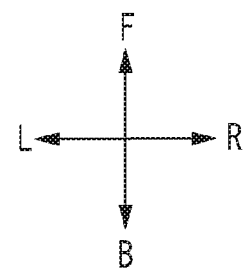

When the joining member 134 takes a posture shown in FIG. 7B, the upper groove 134a extends in the right and left direction, and the lower groove 134b extends in the front and back direction. In this state, when the knob 11 is pushed leftward, the holder 14 holding the knob 11 is slid leftward. The third gear 133 held by the holder 14 is also slid leftward. At this time, the protrusion 133a of the third gear 133 engaged with the upper groove 134a is slid leftward in the upper groove 134a. On the other hand, the joining member 134 engaged with the rotor 12 via the lower groove 134b and the protrusion 121 keeps an initial position thereof. As a result, the knob 11 is slid leftward, independently of the rotor 12, and the switch 30 is operated, like the example described with reference to FIG. 7A.

Figure 7C:
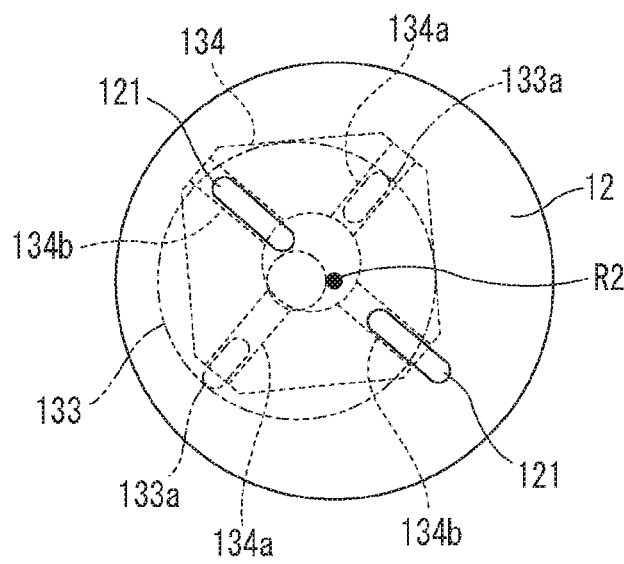
Figure 7C:
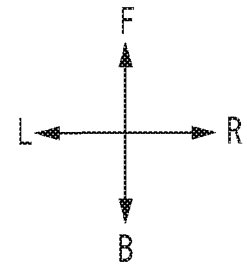

When the joining member 134 takes a posture shown in FIG. 7C, both the upper groove 134a and the lower groove 134b extend in the direction intersecting with the right and left direction. In this state, when the knob 11 is pushed leftward, the holder 14 holding the knob 11 is slid leftward. The third gear 133 held by the holder 14 is also slid leftward. At this time, the protrusion 133a of the third gear 133 engaged with the upper groove 134a is slid in the upper groove 134a, thereby displacing leftward and forward the joining member 134. On the other hand, the protrusion 121 of the rotor 12 engaged with the lower groove 134b in which it is slid keeps the initial position. As a result, the knob 11 is slid leftward, independently of the rotor 12, and the switch 30 is operated, like the example described with reference to FIG. 7A.

According to the above configuration, it is possible to perform the slide operation of the knob 11 in the direction intersecting with the second rotation axis R2 of the rotor 12, irrespective of the knob 11 and a rotating angle position of the rotor 12. Accordingly, it is possible to further improve the degree of operation freedom of the knob 11 configured to be rotatable about the first rotation axis R1.

In the first illustrative embodiment, in the non-operation state of the knob 11 shown in FIG. 1, the first rotation axis R1 and the second rotation axis R2 are offset. Therefore, the knob 11 and the third gear 133 functioning as the slide mechanism are joined via the first gear 131 and the second gear 132.

According to the above configuration, it is possible to improve a degree of arrangement freedom of the knob 11 to the rotor 12. The knob 11 and the third gear 133 can be joined via at least one gear, in correspondence to a positional relation between the knob 11 and the rotor 12.

As shown in FIG. 1, the switch operation mechanism 10 includes a sensor 16. For example, the sensor 16 is an optical sensor of which a light emitting element and a light receiving element are arranged to face each other. On the other hand, the rotor 12 is formed at its lower part with a plurality of slits 122. The plurality of slits 122 is aligned with equal intervals in a circumferential direction about the second rotation axis R2. By the plurality of slits 122, a plurality of wall parts 123 aligned with equal intervals in the circumferential direction is sectioned.

When the rotor 12 is rotated in association with the rotation operation of the knob 11, the slit 122 and the wall part 123 alternately passes between the light emitting element and the light receiving element. Thereby, a state where the light emitted from the light emitting element passes through the slit 122 and is detected by the light receiving element, and a state where the light emitted from the light emitting element is blocked by the wall part 123 are alternately obtained. By monitoring the number of times and speed of the repetition, it is possible to detect the rotation (a rotating angle, a rotating speed and the like) of the rotor 12. When a plurality of pairs of the light emitting element and the light receiving element is provided, it is possible to detect a rotation direction of the rotor 12, too. Since a method of detecting the rotating states (a rotating angle, a rotating speed, a rotation direction and the like) of the rotor 12 and a configuration of the optical sensor for performing the method are well known, the detailed descriptions thereof are omitted.

According to the above configuration, it is possible to implement an operation using the signal, which is to be output from the sensor 16 in correspondence to the rotation operation of the knob 11, in addition to the slide operation of the knob 11 in the direction intersecting with the second rotation axis R2 of the rotor 12.

In other words, the rotation of the rotor 12 can be used for a purpose other than acquisition of the control signal, too. For example, the rotor 12 can be mechanically joined with other mechanism. In this case, it is possible to mechanically operate the other mechanism through the rotation of the knob 11.

The switch operation mechanism 10 includes a board 17. The board 17 has a support surface 171 for supporting the sensor 16. In the first illustrative embodiment, a direction of the displacement accompanied with the slide operation of the knob 11 is parallel with the support surface 171.

According to the above configuration, since the change of the rotor 12 does not change in association with the slide operation of the knob 11, it is not necessary to prepare a design premised on the displacement of the rotor 12 so as to detect the rotation of the rotor 12 by the sensor 16. For example, when it is intended to detect the rotation of the rotor, which is displaced in a direction perpendicular to the support surface 171 together with the knob, by the optical sensor, it is necessary to position a part of the rotor between the light emitting element and the light receiving element, irrespective of the position of the rotor, so that the optical sensor is inevitably enlarged. According to the first illustrative embodiment, it is possible to avoid this situation.

The first illustrative embodiment is just exemplary for easy understanding of the present invention. The configuration of the first illustrative embodiment can be appropriately changed and improved without departing from the gist of the present invention.

In the first illustrative embodiment, the third gear 133 and the joining member 134 are configured to be relatively displaceable. However, the third gear 133 and the joining member 134 may be provided as an integrated member inasmuch as it is possible to implement the operation described with reference to FIG. 7A.

In the first illustrative embodiment, the protrusion 133a is provided at the lower part of the third gear 133, and the upper groove 134a is formed on the upper surface of the joining member 134. However, a groove may be formed at the lower part of the third gear 133, and a protrusion to be engaged with the groove may be provided on the upper surface of the joining member 134.

In the first illustrative embodiment, the protrusion 121 is provided at the upper part of the rotor 12, and the lower groove 134b is formed on the lower surface of the joining member 134. However, a groove may be formed at the upper part of the rotor 12, and a protrusion to be engaged with the groove may be provided on the lower surface of the joining member 134.

In the first illustrative embodiment, the switch 30 is supported to the board 17. However, the arrangement of the switch 30 may be appropriately selected.

Figure 8A:
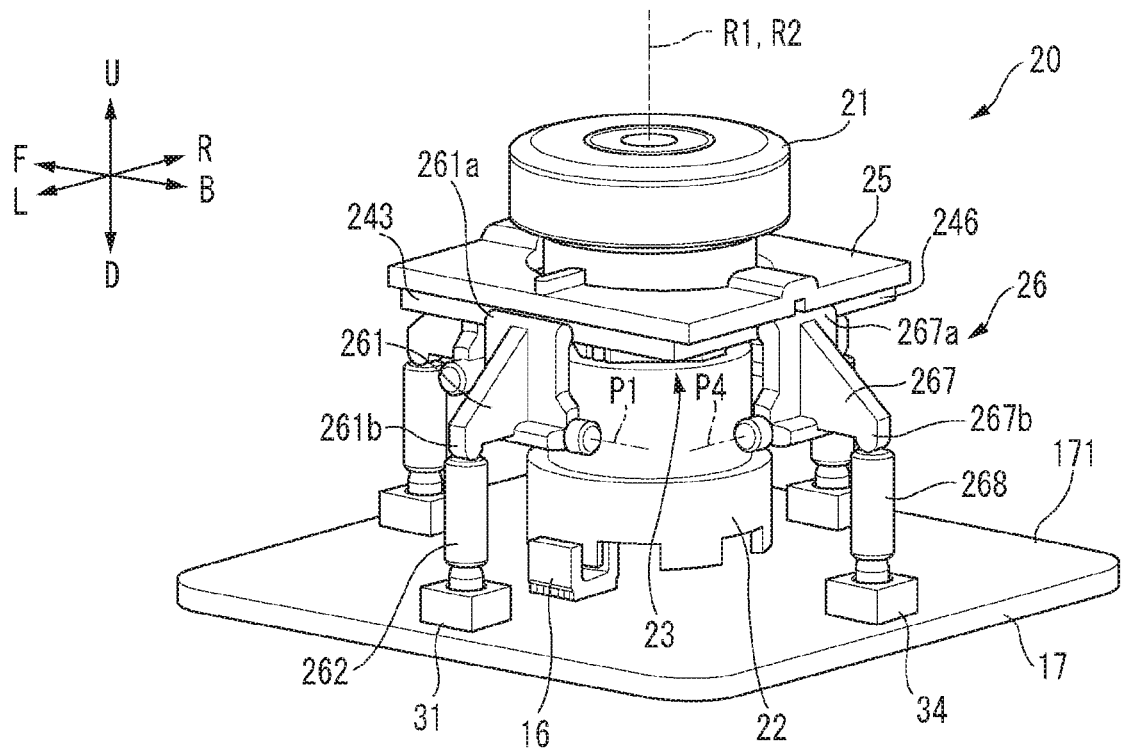
FIGS. 8A and 8B depict an outer shape of a switch operation mechanism in accordance with a second illustrative embodiment.
Figure 8B:
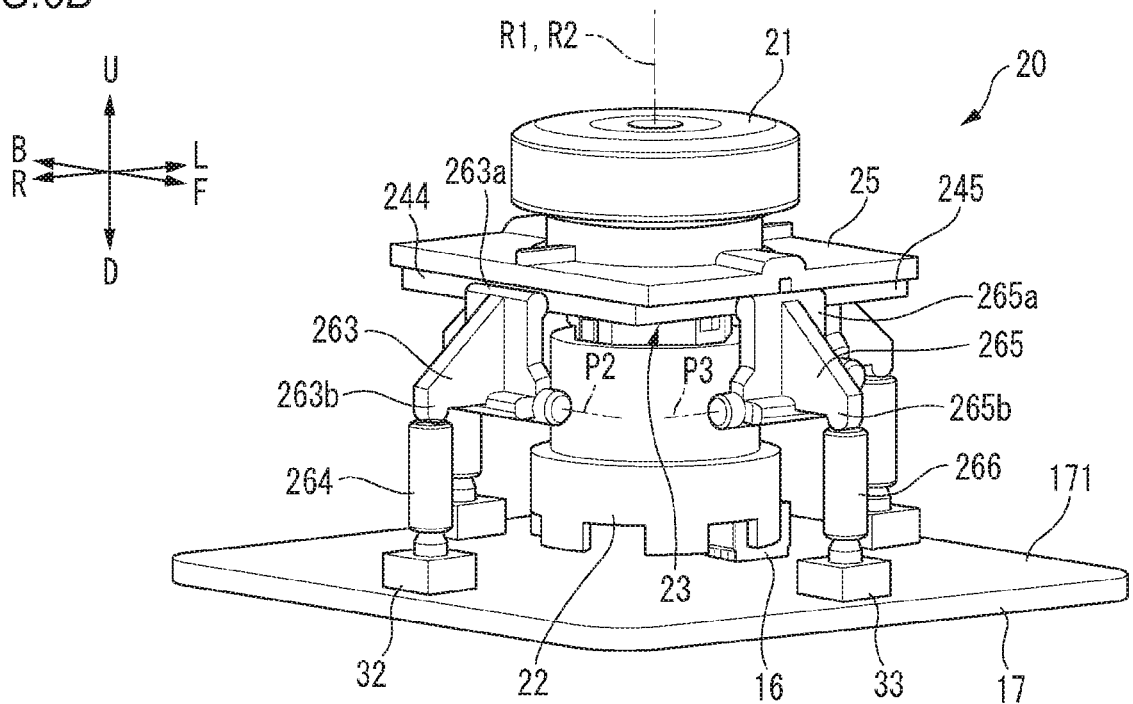

FIGS. 8A and 8B depict an outer shape of a switch operation mechanism 20 in accordance with a second illustrative embodiment. The switch operation mechanism 20 is a mechanism for operating a first switch 31, a second switch 32, a third switch 33, and a fourth switch 34. The constitutional elements, which are substantially the same as the constitutional elements of the switch operation mechanism 10 of the first illustrative embodiment, are denoted with the same reference numerals, and the overlapping descriptions are omitted.

The switch operation mechanism 20 includes a knob 21. The knob 21 is configured to be rotatable about the first rotation axis R1.

The switch operation mechanism 20 includes a rotor 22. The rotor 22 is configured to be rotatable about the second rotation axis R2. In the second illustrative embodiment, the first rotation axis R1 and the second rotation axis R2 coincide with each other in a non-operation state of the knob 21.

Figure 9:
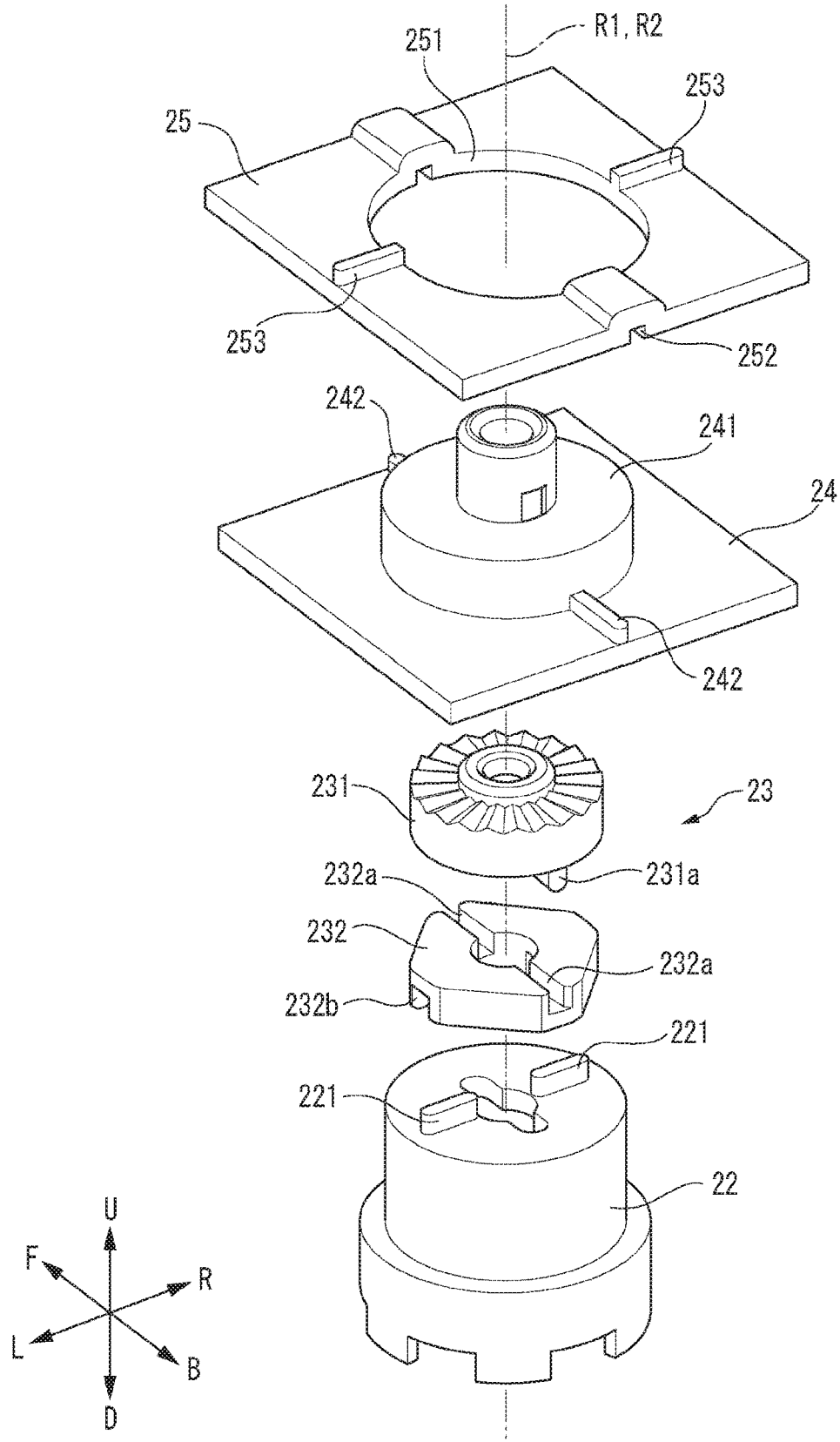
FIG. 9 depicts a part of the switch operation mechanism of FIGS. 8A and 8B.
Figure 10:
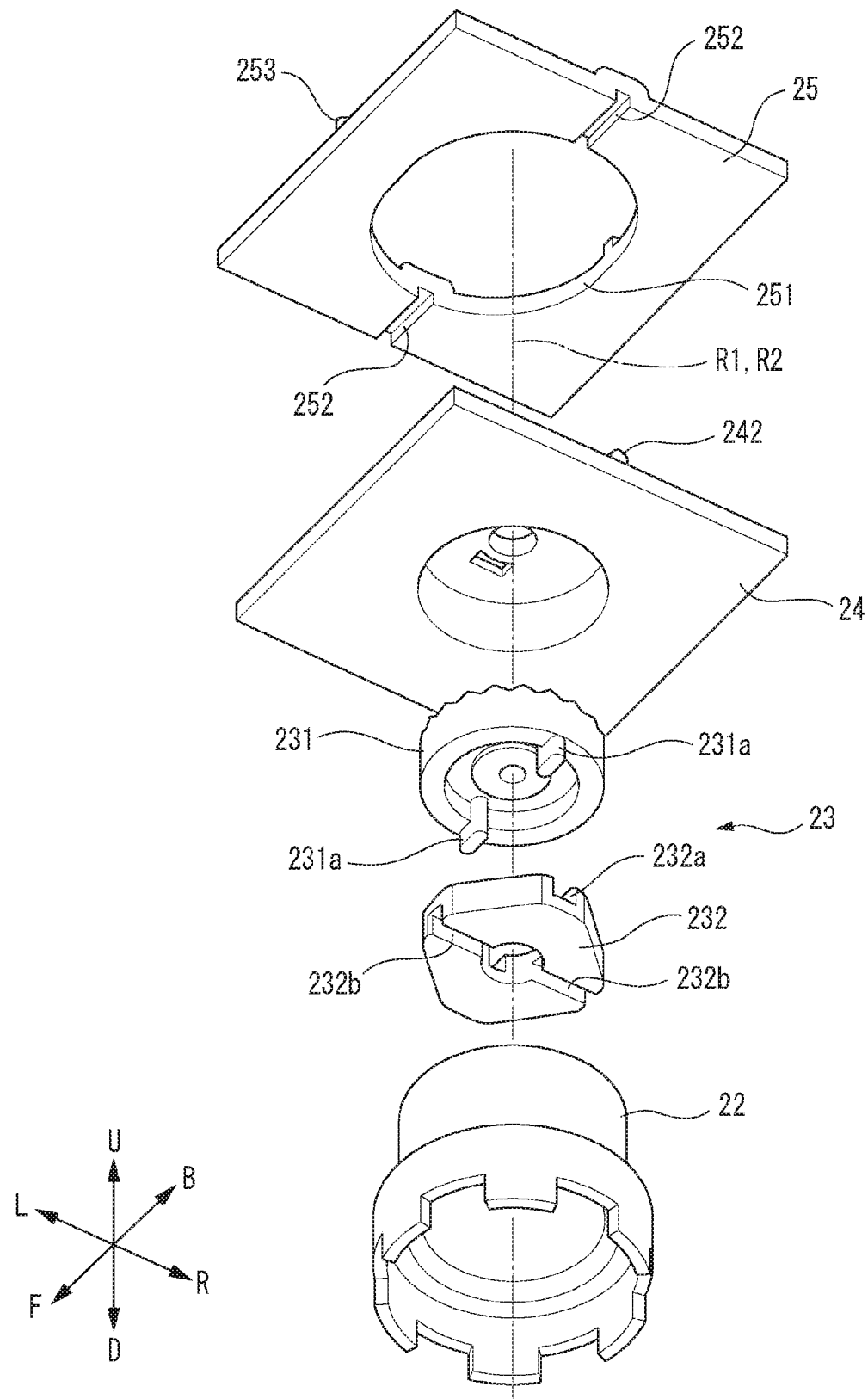
FIG. 10 depicts a part of the switch operation mechanism of FIGS. 8A and 8B.

The switch operation mechanism 20 includes a first transmission mechanism 23. The first transmission mechanism 23 is a mechanism configured to transmit rotation of the knob 21 to the rotor 22. As shown in FIGS. 9 and 10, the first transmission mechanism 23 includes a gear 231 and a joining member 232.

The switch operation mechanism 20 includes a holder 24. The holder 24 has a holding part 241 and a protrusion 242. The holding part 241 is configured to rotatably hold the knob 21. The protrusion 242 is formed on an upper surface of the holder 24. The protrusion 242 extends in the front and back direction.

The switch operation mechanism 20 includes a guide member 25. The guide member 25 has an opening 251, a groove 252, and a slide rail 253. The opening 251 is formed to communicate an upper surface and a lower surface of the guide member 25. The groove 252 is formed on a lower surface of the guide member 25. The groove 252 extends in the front and back direction. The slide rail 253 is formed on an upper surface of the guide member 25. The slide rail 253 extends in the right and left direction. The guide member 25 is supported to be slidable in the right and left direction via the slide rail 253 by a support member (not shown).

The guide member 25 is joined to the holder 24. In this state, the holding part 241 is arranged in the opening 251. The protrusion 242 is engaged with the groove 252.

The joining member 232 has an upper groove 232a and a lower groove 232b. The upper groove 232a is formed on an upper surface of the joining member 232. The lower groove 232b is formed on a lower surface of the joining member 232. The upper groove 232a and the lower groove 232b extend in directions intersecting with each other.

In the meantime, the gear 231 has a protrusion 231a. The protrusion 231a is formed at a lower part of the gear 231. The rotor 22 has a protrusion 221. The protrusion 222 is formed at an upper part of the rotor 22.

When the gear 231, the joining member 232 and the rotor 22 are joined, the protrusion 231a of the gear 231 is engaged with the upper groove 232a of the joining member 232. The protrusion 221 of the rotor 22 is engaged with the lower groove 232b of the joining member 232.

The gear 231 is mounted to the knob 21. The rotation of the knob 21 is transmitted to the rotor 22 via the gear 231 and the joining member 232. Therefore, the rotor 22 is configured to rotate about the second rotation axis R2, in correspondence to the rotation of the knob 21 about the first rotation axis R1.

As shown in FIG. 8A, the switch operation mechanism 20 has a second transmission mechanism 26. The second transmission mechanism 26 includes a first rotary member 261 and a first pressing member 262. The first rotary member 261 is supported to a support member (not shown) to be rotatable about the first rotation axis P1. A first part 261a of the first rotary member 261 is in contact with a left end portion 243 of the holder 24. The first rotary member 261 is urged by a spring (not shown) so that the first part 261a is pressed to the left end portion 243. A second part 261b of the first rotary member 261 is in contact with an upper end of the first pressing member 262. A lower end of the first pressing member 262 is in contact with the first switch 31.

As shown in FIG. 8B, the second transmission mechanism 26 includes a second rotary member 263 and a second pressing member 264. The second rotary member 263 is supported to a support member (not shown) to be rotatable about the second rotation axis P2. A first part 263a of the second rotary member 263 is in contact with a right end portion 244 of the holder 24. The second rotary member 263 is urged by a spring (not shown) so that the first part 263a is pressed to the right end portion 244. A second part 263b of the second rotary member 263 is in contact with an upper end of the second pressing member 264. A lower end of the second pressing member 264 is in contact with the second switch 32.

As shown in FIG. 8B, the second transmission mechanism 26 includes a third rotary member 265 and a third pressing member 266. The third rotary member 265 is supported to a support member (not shown) to be rotatable about a third rotation axis P3. A first part 265a of the third rotary member 265 is in contact with a front end portion 245 of the holder 24. The third rotary member 265 is urged by a spring (not shown) so that the first part 265a is pressed to the front end portion 245. A second part 265b of the third rotary member 265 is in contact with an upper end of the third pressing member 266. A lower end of the third pressing member 266 is in contact with the third switch 33.

As shown in FIG. 8A, the second transmission mechanism 26 includes a fourth rotary member 267 and a fourth pressing member 268. The fourth rotary member 267 is supported to a support member (not shown) to be rotatable about a fourth rotation axis P4. A first part 267a of the fourth rotary member 267 is in contact with a rear end portion 246 of the holder 24. The fourth rotary member 267 is urged by a spring (not shown) so that the first part 267a is pressed to the rear end portion 246. A second part 267b of the fourth rotary member 267 is in contact with an upper end of the fourth pressing member 268. A lower end of the fourth pressing member 268 is in contact with the fourth switch 34.

Figure 11A:
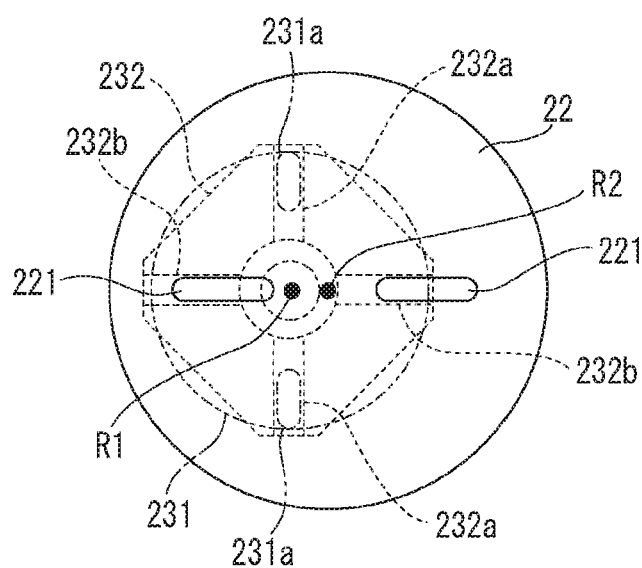
FIGS. 11A to 11C are views for illustrating operations of the switch operation mechanism of FIGS. 8A and 8B.
Figure 11A:
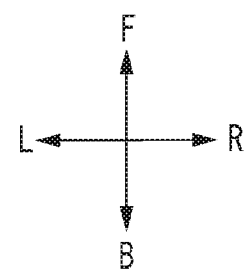

When the joining member 232 takes a posture shown in FIG. 11A, the upper groove 232a extends in the front and back direction and the lower groove 232b extends in the right and left direction. In this state, when the knob 21 is pushed leftward, the holder 24 holding the knob 21 is slid leftward. The gear 231 mounted to the knob 21 is also slid leftward. Thereby, the joining member 232 engaged with the protrusion 231a of the gear 231 via the upper groove 232a is also slid leftward. On the other hand, the protrusion 221 of the rotor 22 engaged with the lower groove 232b in which it is slid keeps an initial position. As a result, the knob 21 is slid leftward, independently of the rotor 22.

Figure 12A:
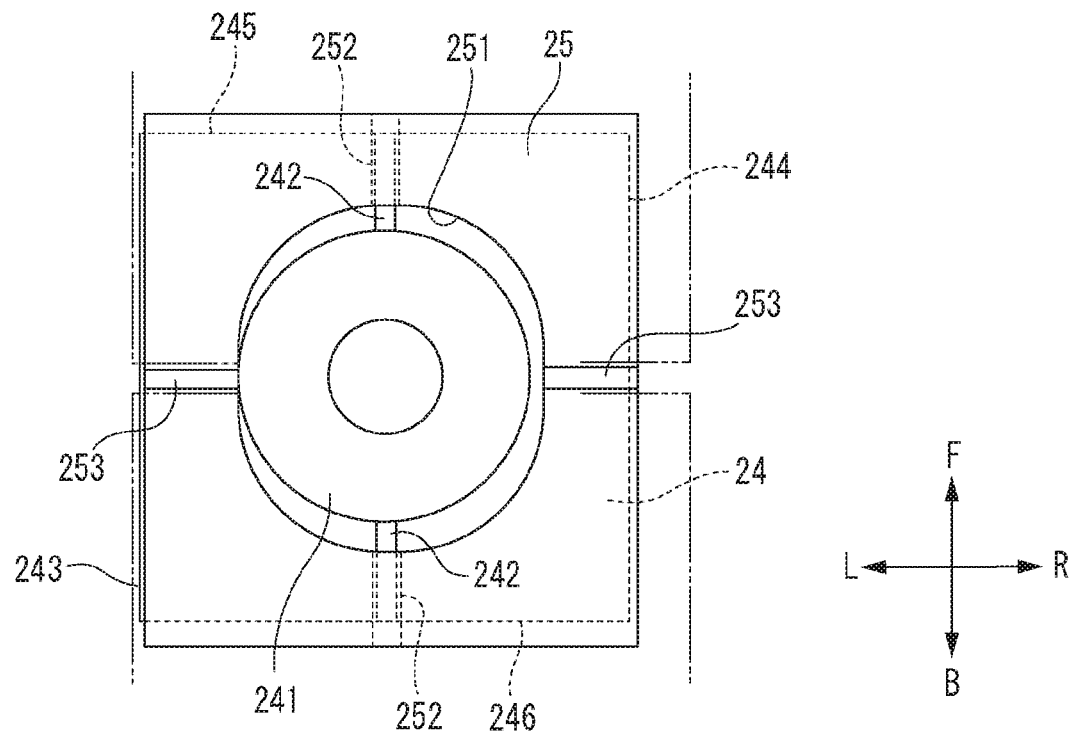
FIGS. 12A and 12B are views for illustrating operations of the switch operation mechanism of FIGS. 8A and 8B.

On the other hand, as shown in FIG. 12A, the holding part 241 of the holder 24 holding the knob 21 is contacted to a left edge of the opening 251, thereby pushing leftward the guide member 25. The guide member 25 is slid leftward via the slide rail 253, together with the holder 24.

By the above operations, the left end portion 243 of the holder 24 pushes leftward the first part 261a of the first rotary member 261. The first rotary member 261 is rotated against the urging force of the spring about the first rotation axis P1 in the counterclockwise direction in FIG. 8A. Thereby, the second part 261b of the first rotary member 261 pushes downward the first pressing member 262, so that the first switch 31 is operated. That is, the holder 24 also configures a part of the second transmission mechanism 26.

When the leftward pressing operation to the knob 21 is released, the first rotary member 261 is rotated about the rotation axis P in the clockwise direction in FIG. 8A by the urging force of the spring. Thereby, the first part 261a of the first rotary member 261 pushes rightward the left end portion 243 of the holder 24, so that the gear 231 mounted to the knob 21 is slid rightward. The joining member 232 engaged with the protrusion 231a of the gear 231 via the upper groove 232a is also slid rightward. As a result, the knob 21 returns to the initial position.

That is, the joining member 232 functions as a slide mechanism configured to allow the displacement of the knob 21 in the right and left direction intersecting with the second rotation axis R2 extending in the upper and lower direction.

According to the above configuration, it is possible to perform the slide operation of the knob 21 in the direction intersecting with the second rotation axis R2 of the rotor 22, in addition to the operation of transmitting the rotation of the knob 21 to the rotor 22. Accordingly, it is possible to improve a degree of operation freedom of the knob 21 configured to be rotatable about the first rotation axis R1. Also, since the position of the second rotation axis R2 does not change during the displacement of the knob 21, it is not necessary to prepare a configuration premised on the displacement of the rotor 22. Thereby, it is possible to simplify a structure of the switch operation mechanism 20.

In the example of FIG. 11A, as the knob 21 is displaced, both the gear 231 and the joining member 232 are displaced in the same direction. In the second illustrative embodiment, the gear 231 is configured to be displaceable relative to the joining member 232. That is, the gear 231 and the joining member 232 function as two sliders capable of being displaced in the directions intersecting with each other.

Figure 11B:
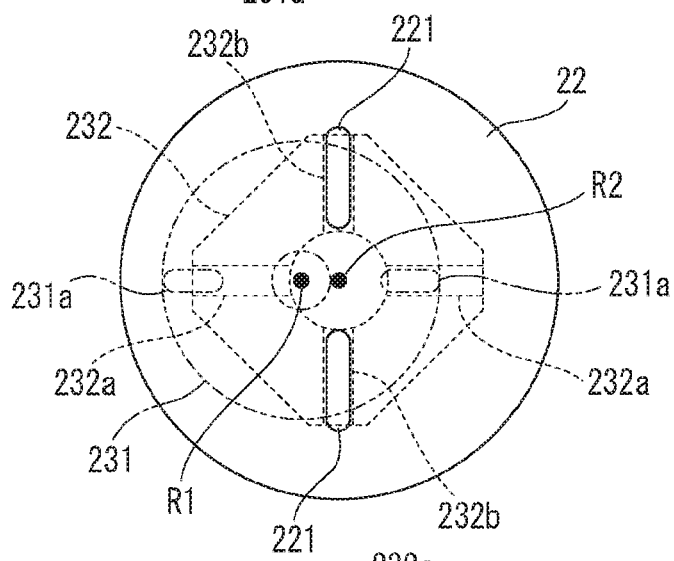
Figure 11B:
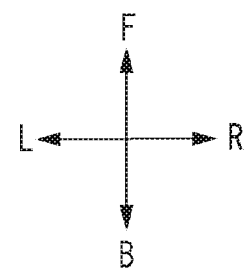

When the joining member 232 takes a posture shown in FIG. 11B, the upper groove 232a extends in the right and left direction, and the lower groove 232b extends in the front and back direction. In this state, when the knob 21 is pushed leftward, the holder 24 holding the knob 21 is slid leftward. The gear 231 held by the holder 24 is also slid leftward. At this time, the protrusion 231a of the gear 231 engaged with the upper groove 232a is slid leftward in the upper groove 232a. On the other hand, the joining member 232 engaged with the rotor 22 via the lower groove 232b and the protrusion 221 keeps an initial position thereof. As a result, the knob 21 is slid leftward, independently of the rotor 22, and the first switch 31 is operated, like the example described with reference to FIG. 11A.

Figure 11C:
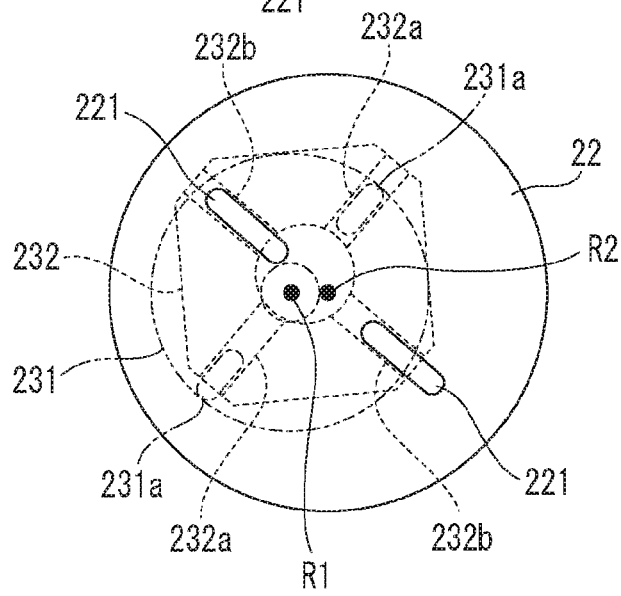
Figure 11C:
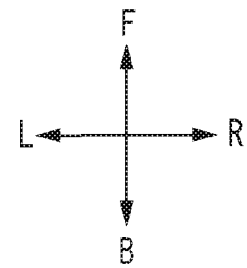

When the joining member 232 takes a posture shown in FIG. 11C, both the upper groove 232a and the lower groove 232b extend in the direction intersecting with the right and left direction. In this state, when the knob 21 is pushed leftward, the holder 24 holding the knob 21 is slid leftward. The gear 231 held by the holder 24 is also slid leftward. At this time, the protrusion 231a of the gear 231 engaged with the upper groove 232a is slid in the upper groove 232a, thereby displacing leftward and forward the joining member 232. On the other hand, the protrusion 221 of the rotor 22 engaged with the lower groove 232b in which it is slid keeps the initial position. As a result, the knob 21 is slid leftward, independently of the rotor 22, and the first switch 31 is operated, like the example described with reference to FIG. 11A.

According to the above configuration, it is possible to perform the slide operation of the knob 21 in the direction intersecting with the second rotation axis R2 of the rotor 22, irrespective of the knob 21 and the rotating angle position of the rotor 22. Accordingly, it is possible to further improve the degree of operation freedom of the knob 21 configured to be rotatable about the first rotation axis R1.

When the knob 21 is pushed rightward from the initial position, the second switch 32 is operated. The operation principle can be described by symmetrically setting FIGS. 11A to 11C and FIG. 12A with respect to the second rotation axis R2.

In the second illustrative embodiment, the guide member 25 is configured to allow the displacement of the knob 21 in the front and back direction. The front and back direction is an example of the second direction.

Figure 13A:
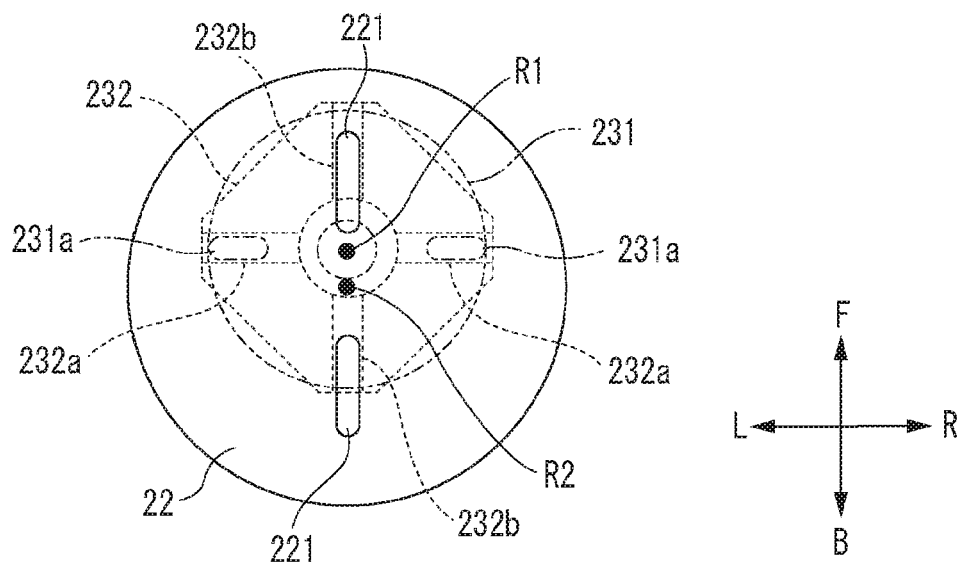
FIGS. 13A to 13C are views for illustrating operations of the switch operation mechanism of FIGS. 8A and 8B.

When the joining member 232 takes a posture shown in FIG. 13A, the upper groove 232a extends in the right and left direction and the lower groove 232b extends in the upper and lower direction. In this state, when the knob 21 is pushed forward, the holder 24 holding the knob 21 is slid forward. The gear 231 mounted to the knob 21 is also slid forward. Thereby, the joining member 232 engaged with the protrusion 231a of the gear 231 via the upper groove 232a is also slid forward. On the other hand, the protrusion 221 of the rotor 22 engaged with the lower groove 232b in which it is slid keeps the initial position. As a result, the knob 21 is slid forward, independently of the rotor 22.

Figure 12B:
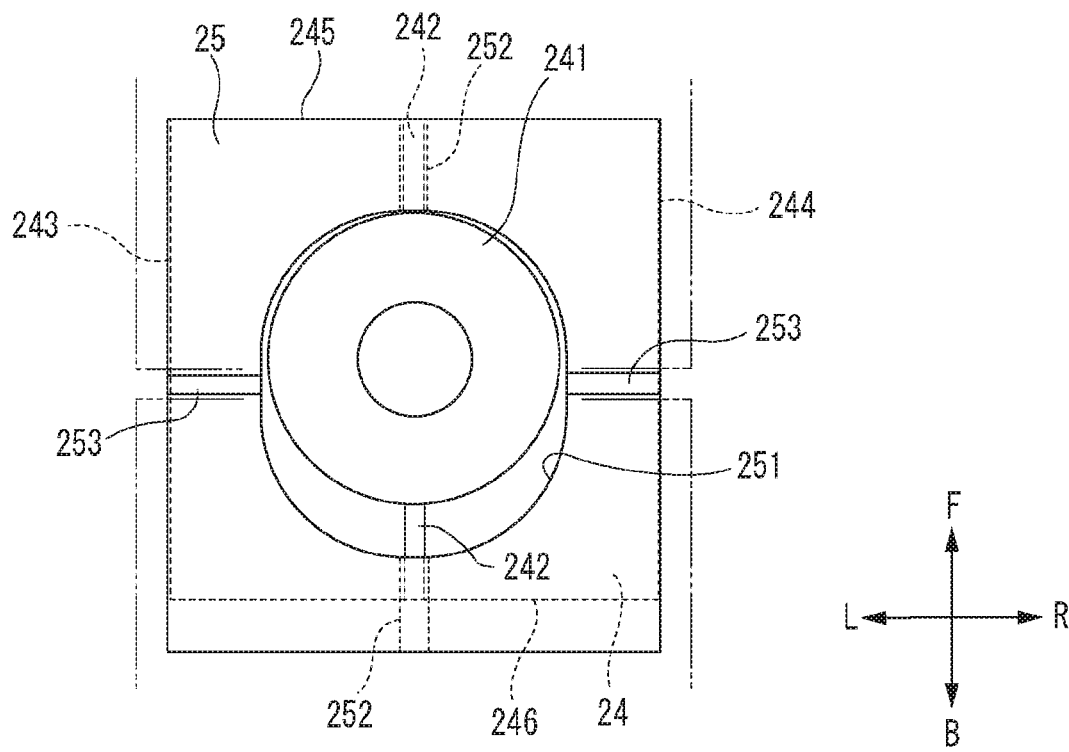

As shown in FIG. 12B, a length size of the opening 251 of the guide member 25 in the front and back direction is greater than a length size of the holding part 241 of the holder 24 in the front and back direction. Also, the protrusion 242 can be slid in the groove 252. Therefore, the holding part 241 can be slid in the opening 251 in the front and back direction.

By the above operations, the front end portion 245 of the holder 24 pushes forward the first part 265a of the third rotary member 265. The third rotary member 265 is rotated against the urging force of the spring about the third rotation axis P3 in the clockwise direction in FIG. 8B. Thereby, the second part 265b of the third rotary member 265 pushes downward the third pressing member 266, so that the third switch 33 is operated. That is, the holder 24 and the guide member 25 also configure a part of the second transmission mechanism 26.

When the forward pressing operation to the knob 21 is released, the third rotary member 265 is rotated about the third rotation axis P3 in the counterclockwise direction in FIG. 8B by the urging force of the spring. Thereby, the first part 265a of the third rotary member 265 pushes backward the front end portion 245 of the holder 24, so that the gear 231 mounted to the knob 21 is slid backward. The joining member 232 engaged with the protrusion 231a of the gear 231 via the upper groove 232a is also slid backward. As a result, the knob 21 returns to the initial position.

According to the above configuration, it is possible to perform the slide operation of the knob 21 in the front and back direction intersecting with the second rotation axis R2 of the rotor 22 and the right and left direction, in addition to the operation of transmitting the rotation of the knob 21 to the rotor 22 and the slide operation of the knob 21 in the right and left direction. Accordingly, it is possible to further improve the degree of operation freedom of the knob 21 configured to be rotatable about the first rotation axis R1.

In the example of FIG. 13A, as the knob 21 is displaced, both the gear 231 and the joining member 232 are displaced in the same direction. In the second illustrative embodiment, the gear 231 is configured to be displaceable relative to the joining member 232.

Figure 13B:
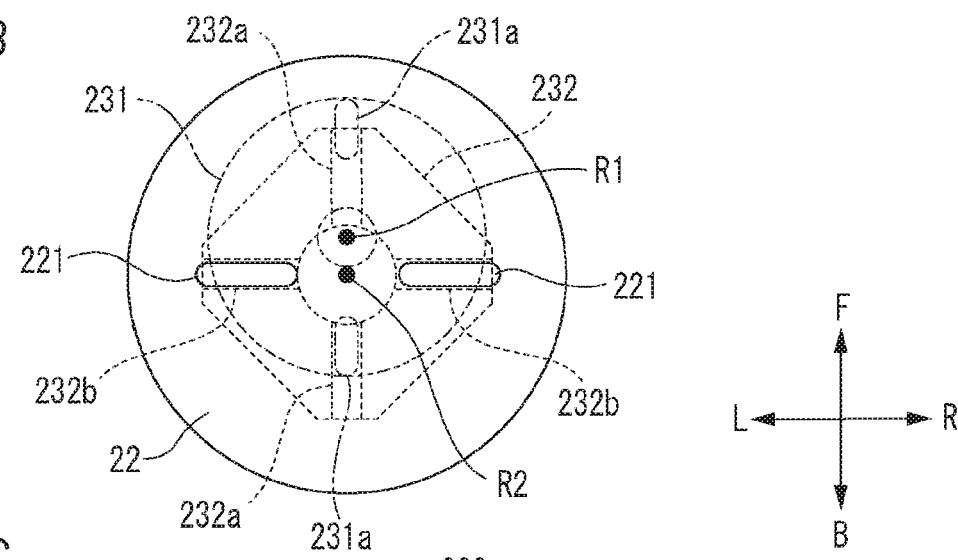

When the joining member 232 takes a posture shown in FIG. 13B, the upper groove 232a extends in the front and back direction, and the lower groove 232b extends in the right and left direction. In this state, when the knob 21 is pushed forward, the holder 24 holding the knob 21 is slid forward. The gear 231 held by the holder 24 is also slid forward. At this time, the protrusion 231a of the gear 231 engaged with the upper groove 232a is slid forward in the upper groove 232a. On the other hand, the joining member 232 engaged with the rotor 22 via the lower groove 232b and the protrusion 221 keeps the initial position thereof. As a result, the knob 21 is slid forward, independently of the rotor 22, and the third switch 33 is operated, like the example described with reference to FIG. 13A.

Figure 13C:
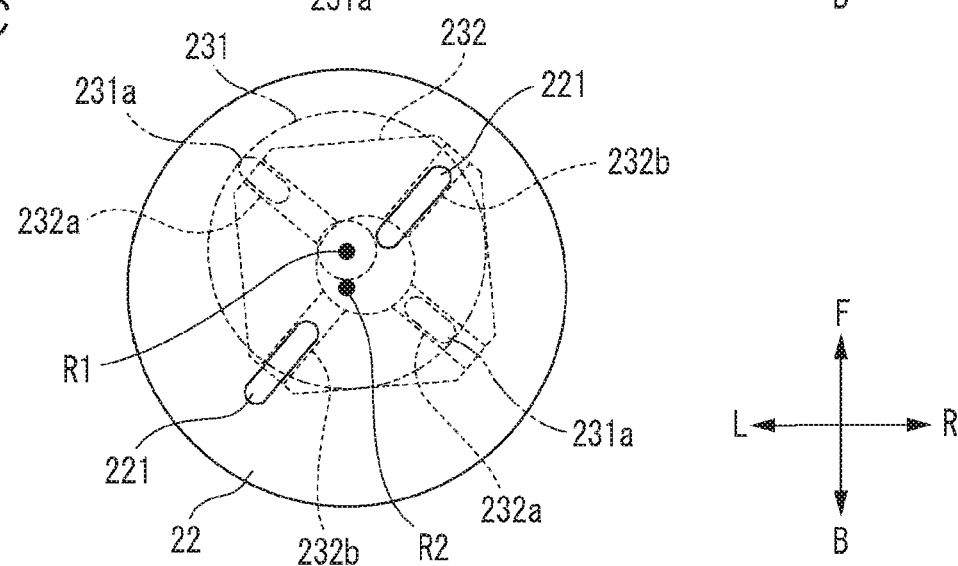

When the joining member 232 takes a posture shown in FIG. 13C, both the upper groove 232a and the lower groove 232b extend in the direction intersecting with the front and back direction. In this state, when the knob 21 is pushed forward, the holder 24 holding the knob 21 is slid forward. The gear 231 held by the holder 24 is also slid forward. At this time, the protrusion 231a of the gear 231 engaged with the upper groove 232a is slid in the upper groove 232a, thereby displacing rightward and forward the joining member 232. On the other hand, the protrusion 221 of the rotor 22 engaged with the lower groove 232b in which it is slid keeps the initial position. As a result, the knob 21 is slid forward, independently of the rotor 22, and the third switch 33 is operated, like the example described with reference to FIG. 13A.

According to the above configuration, it is possible to perform the slide operation of the knob 21 in the front and back direction intersecting with the second rotation axis R2 of the rotor 22 and the right and left direction, irrespective of the knob 21 and the rotating angle position of the rotor 22. Accordingly, it is possible to further improve the degree of operation freedom of the knob 21 configured to be rotatable about the first rotation axis R1.

When the knob 21 is pushed backward from the initial position, the fourth switch 34 is operated. The operation principle can be described by symmetrically setting FIG. 12B and FIGS. 13A to 13C with respect to the second rotation axis R2.

The second illustrative embodiment is just exemplary for easy understanding of the present invention. The configuration of the second illustrative embodiment can be appropriately changed and improved without departing from the gist of the present invention.

In the second illustrative embodiment, the gear 231 and the joining member 232 are configured to be relatively displaceable. However, the gear 231 and the joining member 232 may be provided as an integrated member inasmuch as it is possible to implement the operation described with reference to FIG. 11A and FIG. 13A.

In the second illustrative embodiment, the protrusion 231a is provided at the lower part of the gear 231, and the upper groove 232a is formed on the upper surface of the joining member 232. However, a groove may be formed at the lower part of the gear 231, and a protrusion to be engaged with the groove may be provided on the upper surface of the joining member 232.

In the second illustrative embodiment, the protrusion 221 is provided at the upper part of the rotor 22, and the lower groove 232b is formed on the lower surface of the joining member 232. However, a groove may be formed at the upper part of the rotor 22, and a protrusion to be engaged with the groove may be provided on the lower surface of the joining member 232.

In the second illustrative embodiment, the protrusion 242 is provided on the upper surface of the holder 24, and the groove 252 is formed on the lower surface of the guide member 24. However, a groove may be formed on the upper surface of the holder 24, and a protrusion to be engaged with the groove may be provided on the lower surface of the guide member 25.

In the second illustrative embodiment, the first switch 31, the second switch 32, the third switch 33 and the fourth switch 34 are supported to the board 17. However, the arrangement of at least one of the first switch 31, the second switch 32, the third switch 33 and the fourth switch 34 may be appropriately selected.

According to an aspect of the invention, there is provided a switch operation mechanism comprising: a knob configured to be rotatable about a first rotation axis; a rotor configured to be rotatable about a second rotation axis; a first transmission mechanism configured to transmit rotation of the knob to the rotor and including a slide mechanism configured to allow displacement of the knob in a first direction intersecting with the second rotation axis; and a second transmission mechanism configured to convert the displacement of the knob in the first direction into an operation of a switch.

According to the above configuration, it is possible to perform the slide operation of the knob in the direction intersecting with the second rotation axis of the rotor, in addition to the operation of transmitting the rotation of the knob to the rotor. Accordingly, it is possible to improve a degree of operation freedom of the knob configured to be rotatable about the first rotation axis. Also, since a position of the second rotation axis does not change during the displacement of the knob, it is not necessary to prepare a configuration premised on the displacement of the rotor. Thereby, it is possible to simplify a structure of the switch operation mechanism.

The switch operation mechanism may be configured as follows. The slide mechanism includes two sliders capable of being displaced in directions intersecting with each other.

According to the above configuration, it is possible to perform the slide operation of the knob in the direction intersecting with the second rotation axis of the rotor, irrespective of the knob and a rotating angle position of the rotor. Accordingly, it is possible to further improve the degree of operation freedom of the knob configured to be rotatable about the first rotation axis.

The switch operation mechanism may be configured as follows. In a non-operation state of the knob, the first rotation axis and the second rotation axis are offset, and the knob and the slide mechanism are joined each other via at least one gear.

According to the above configuration, it is possible to improve a degree of arrangement freedom of the knob to the rotor.

Alternatively, the switch operation mechanism may be configured as follows. The second transmission mechanism includes a guide member configured to allow displacement of the knob in a second direction intersecting with both the second rotation axis and the first direction.

According to the above configuration, it is possible to perform the slide operation of the knob in the second direction, in addition to the operation of transmitting the rotation of the knob to the rotor and the slide operation of the knob in the first direction. Accordingly, it is possible to further improve the degree of operation freedom of the knob configured to be rotatable about the first rotation axis.

The switch operation mechanism may be configured as follows. The switch operation mechanism further comprises a sensor configured to detect rotation of the rotor.

According to the above configuration, it is possible to implement an operation using a signal, which is to be output from the sensor in correspondence to the rotation operation of the knob, in addition to the slide operation of the knob in the direction intersecting with the second rotation axis of the rotor.

In this case, the switch operation mechanism may be configured as follows. The switch operation mechanism further comprises a board having a support surface for supporting the sensor, and the first direction is parallel with the support surface.

According to the above configuration, since the position of the rotor does not change in association with the slide operation of the knob, it is not necessary to prepare a design premised on the displacement of the rotor so as to detect the rotation of the rotor by the sensor.

According to the present invention, it is possible to improve the degree of operation freedom of the knob configured to be rotatable about the rotation axis.

What is claimed is:

1. A switch operation mechanism comprising:
    a knob configured to be rotatable about a first rotation axis;
    a rotor configured to be rotatable about a second rotation axis;
    a first transmission mechanism configured to transmit rotation of the knob to the rotor and including a slide mechanism that is positioned on the second rotation axis and configured to allow displacement of the knob in a first direction intersecting with the second rotation axis; and
    a second transmission mechanism configured to convert the displacement of the knob in the first direction into an operation of a switch, wherein
    the slide mechanism includes two sliders that are each disposed above the rotor along the second rotation axis and that slide relative to each other in directions intersecting the second rotation axis while maintaining engagement with the rotor in both of a non-operation state of the knob and a slide-operation state of the knob.

2. The switch operation mechanism according to claim 1, wherein, in the non-operation state of the knob, the first rotation axis and the second rotation axis are offset, and
    the knob and the slide mechanism are joined each other via at least one gear.

3. The switch operation mechanism according to claim 1, wherein the second transmission mechanism includes a guide member configured to allow displacement of the knob in a second direction intersecting with both the second rotation axis and the first direction.

4. The switch operation mechanism according to claim 1, further comprising a sensor configured to detect rotation of the rotor.

5. The switch operation mechanism according to claim 4, further comprising a board having a support surface for supporting the sensor, wherein
the first direction is parallel with the support surface.

6. The switch operation mechanism according to claim 1, wherein
the slide mechanism is disposed between the knob and the rotor in a direction parallel to the second rotation axis.

7. A switch operation mechanism comprising:
a knob to which a rotation operation can be performed about a first rotation axis;
a rotor configured to be rotatable about a second rotation axis;
a first transmission mechanism configured including a slide mechanism that is positioned on the second rotation axis and configured to transmit the rotation operation of the knob to the rotor and to allow displacement by a slide operation of the knob in a first direction intersecting with the second rotation axis; and
a second transmission mechanism configured to convert the displacement of the knob by the slide operation into an operation of a switch, wherein
the slide mechanism includes two sliders that are each disposed above the rotor along the second rotation axis and that slide relative to each other in directions intersecting the second rotation axis while maintaining engagement with the rotor in both of a non-operation state of the knob and a slide-operation state of the knob, and
in the non-operation state of the knob, the first rotation axis and the second rotation axis are offset.

8. The switch operation mechanism according to claim 7, wherein
the slide mechanism is disposed between the knob and the rotor in a direction parallel to the second rotation axis.

9. A switch operation mechanism comprising:
a knob configured to be rotatable about a first rotation axis;
a rotor configured to be rotatable about a second rotation axis;
a first transmission mechanism configured to transmit rotation of the knob to the rotor and including a slide mechanism that is positioned on the second rotation axis and configured to allow displacement of the knob in a first direction intersecting with the second rotation axis; and
a second transmission mechanism configured to convert the displacement of the knob in the first direction into an operation of a switch through a rotation operation about a rotation axis extending in a direction different from the first rotation axis and the second rotation axis, wherein
the slide mechanism includes two sliders that are each disposed above the rotor along the second rotation axis and that slide relative to each other in directions intersecting the second rotation axis while maintaining engagement with the rotor in both of a non-operation state of the knob and a slide-operation state of the knob, and
in a non-displacement state of the knob, the first rotation axis and the second rotation axis are offset in the first direction.

10. The switch operation mechanism according to claim 9, wherein
the slide mechanism is disposed between the knob and the rotor in a direction parallel to the second rotation axis.

11. A switch operation mechanism comprising:
a knob configured to be rotatable about a first rotation axis;
a rotor configured to be rotatable about a second rotation axis;
a first transmission mechanism configured to transmit rotation of the knob to the rotor and including a slide mechanism that is positioned on the second rotation axis and configured to allow displacement of the knob in a first direction intersecting with the second rotation axis; and
a second transmission mechanism configured to convert the displacement of the knob in the first direction into an operation of a switch, wherein
the slide mechanism includes a first slider disposed above the rotor along the second rotation axis and a second slider disposed above the first slider along the second rotation axis,
the first slider has a upper groove formed on an upper surface of the first slider and a lower groove formed on a lower surface of the first slider, the upper groove and the lower groove extends in directions intersecting the second rotation axis and intersecting with each other,
the second slider has a protrusion slidably engaged with the upper groove,
the rotor has a protrusion slidably engaged with the lower groove,
the rotation of the knob is transmitted from the second slider via the first slider to the rotor, and
the second slider slides along the upper groove with respect to the first slider and/or the first slider slides along the lower groove with respect to the rotor in response to the displacement of the knob in the first direction.

* * * * *